(12) United States Patent
Wang (10) Patent No.: US 10,511,797 B2
(45) Date of Patent: Dec. 17, 2019

(54) SOUND-PRODUCING COMPONENT AND DISPLAY DEVICE

(71) Applicants: BOE TECHNOLOGY GROUP CO., LTD., Beijing (CN); K-TRONICS (SUZHOU) TECHNOLOGY CO., LTD., Suzhou, Jiangsu (CN)

(72) Inventor: Jie Wang, Beijing (CN)

(73) Assignees: BOE TECHNOLOGY GROUP CO., LTD., Beijing (CN); K-TRONICS (SUZHOU) TECHNOLOGY CO., LTD., Suzhou, Jiangsu (CN)

( * ) Notice: Subject to any disclaimer, the term of this patent is extended or adjusted under 35 U.S.C. 154(b) by 140 days.

(21) Appl. No.: 15/562,300

(22) PCT Filed: Apr. 1, 2017

(86) PCT No.: PCT/CN2017/079289
§ 371 (c)(1),
(2) Date: Sep. 27, 2017

(87) PCT Pub. No.: WO2017/202143
PCT Pub. Date: Nov. 30, 2017

(65) Prior Publication Data
US 2018/0191989 A1    Jul. 5, 2018

(30) Foreign Application Priority Data
May 26, 2016  (CN) .................... 2016 2 0497930 U (51) Int. Cl.
*H04N 5/60* (2006.01)
*H04N 5/64* (2006.01)
(Continued)

(52) U.S. Cl.
CPC ................. *H04N 5/60* (2013.01); *H04N 5/64* (2013.01); *H04R 1/025* (2013.01); *H04N 5/642* (2013.01); *H04R 9/06* (2013.01); *H04R 2499/15* (2013.01)

(58) Field of Classification Search
CPC . H04N 5/60; H04N 5/64; H04N 5/642; H04R 1/025; H04R 2499/15; H04R 9/06
See application file for complete search history.

(56) References Cited

U.S. PATENT DOCUMENTS 4,422,222 A * 12/1983 Notoya ................. F16B 5/0642
24/289
4,524,494 A *  6/1985 Sato ...................... F16B 21/082
174/138 D
(Continued)

FOREIGN PATENT DOCUMENTS

CN       2742586 Y    11/2005
CN     11853440 A    10/2006
(Continued)

OTHER PUBLICATIONS

International Search Report and Written Opinion dated Jun. 28, 2017; PCT/CN2017/079289.

*Primary Examiner* — Oyesola C Ojo
(74) *Attorney, Agent, or Firm* — Ladas & Parry LLP (57) ABSTRACT

A sound-producing component and a display device are disclosed. The sound-producing component includes a sound-producing element, a backplane and at least one elastic element. The elastic element includes a first clamping portion and a second clamping portion; the sound-producing element includes a first mounting portion; the backplane includes a second mounting portion; the first mounting portion is clamped with one of the first clamping portion and the second clamping portion; and the second mounting portion is clamped with the other of the first clamping
(Continued)

portion and the second clamping portion. Thus, the sound-producing element is fixed on the backplane.

19 Claims, 4 Drawing Sheets

(51) Int. Cl.
    *H04R 1/02*     (2006.01)
    *H04R 9/06*     (2006.01)

(56) References Cited

U.S. PATENT DOCUMENTS

| | | | | |
|---|---|---|---|---|
| 4,629,356 A * | 12/1986 | Hayashi | ............... | F16B 5/065 |
| | | | | 174/138 D |
| 4,681,288 A * | 7/1987 | Nakamura | ............... | F16B 5/065 |
| | | | | 24/453 |
| D293,880 S * | 1/1988 | Takahashi | ............... | 174/138 D |
| 6,042,296 A * | 3/2000 | Wittig | ............... | F16B 5/0642 |
| | | | | 24/297 |
| 6,305,892 B1 * | 10/2001 | Qiao | ............... | F16B 5/065 |
| | | | | 411/508 |
| 6,744,903 B1 * | 6/2004 | Jeon | ............... | G06F 1/1605 |
| | | | | 348/E5.13 |
| 7,717,227 B2 * | 5/2010 | Kusano | ............... | H04R 1/025 |
| | | | | 181/148 |
| 7,798,740 B2 * | 9/2010 | Kaufman | ............... | F16B 12/38 |
| | | | | 403/408.1 |
| 7,894,182 B2 * | 2/2011 | Wang | ............... | G06F 1/1605 |
| | | | | 349/56 |
| 8,126,186 B2 * | 2/2012 | Kameoka | ............... | G06F 1/1605 |
| | | | | 381/333 |
| 8,861,763 B2 * | 10/2014 | Yukawa | ............... | H04R 1/2896 |
| | | | | 381/333 |
| 10,085,079 B2 * | 9/2018 | Sato | ............... | H04R 1/025 |
| 2004/0208728 A1 * | 10/2004 | Fattori | ............... | F16B 21/082 |
| | | | | 411/508 |
| 2006/0280328 A1 * | 12/2006 | Nakagawa | ............... | H04R 1/025 |
| | | | | 381/388 |
| 2007/0274803 A1 | 11/2007 | Kusano | | |
| 2009/0242322 A1 * | 10/2009 | Tsai | ............... | F16F 1/373 |
| | | | | 181/207 |
| 2011/0186705 A1 * | 8/2011 | Ke | ............... | F16M 13/02 |
| | | | | 248/224.8 |

FOREIGN PATENT DOCUMENTS

| | | |
|---|---|---|
| CN | 201533384 U | 7/2010 |
| CN | 103108512 A | 5/2013 |
| CN | 203691575 U | 7/2014 |
| CN | 204567430 U | 8/2015 |
| CN | 205647984 U | 10/2016 |
| EP | 0474167 A2 | 3/1992 |
| JP | 0595594 A | 4/1993 |
| JP | 07107583 A | 4/1995 |

* cited by examiner

SOUND-PRODUCING COMPONENT AND DISPLAY DEVICE

TECHNICAL FIELD

At least one embodiment of the present disclosure relates to a sound-producing component and a display device.

BACKGROUND

As for a display device, e.g., a TV, the user is concerned about the image quality at first and then the sound effect. Therefore, good sound effect can enhance the user experience.

SUMMARY

At least one embodiment of the present disclosure relates to a sound-producing component and a display device, which can improve the sound effect, save the cost and optimize the productivity.

At least one embodiment of the present disclosure provides a sound-producing component, comprising a sound-producing element, a backplane and at least one elastic element, wherein the elastic element comprises a first clamping portion and a second clamping portion; the sound-producing element comprises a first mounting portion; the backplane comprises a second mounting portion; the first mounting portion is clamped with the first clamping portion; and the second mounting portion is clamped with the second clamping portion.

At least one embodiment of the present disclosure provides a display device, comprising the sound-producing component according to any one of the embodiments provided by the present disclosure.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should hbe within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present disclosure, are not intended to indicate any sequence, amount or importance, but distinguish various components. Also, the terms such as "a," "an," etc., are not intended to limit the amount, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. "On," "under," "right," "left" and the like are only used to indicate relative position relationship, and when the position of the object which is described is changed, the relative position relationship can he changed accordingly.

For the improvement of sound effect, in addition to the selection of a good loudspeaker, the mounting structure/mode of the loudspeaker and the complete machine (a backplane of a display device) also has a great impact on the sound effect. If the loudspeaker and the complete machine cannot be well fixed, even if a good loudspeaker is chosen, the sound effect produced by the complete machine will also be greatly reduced.

Figure 1:
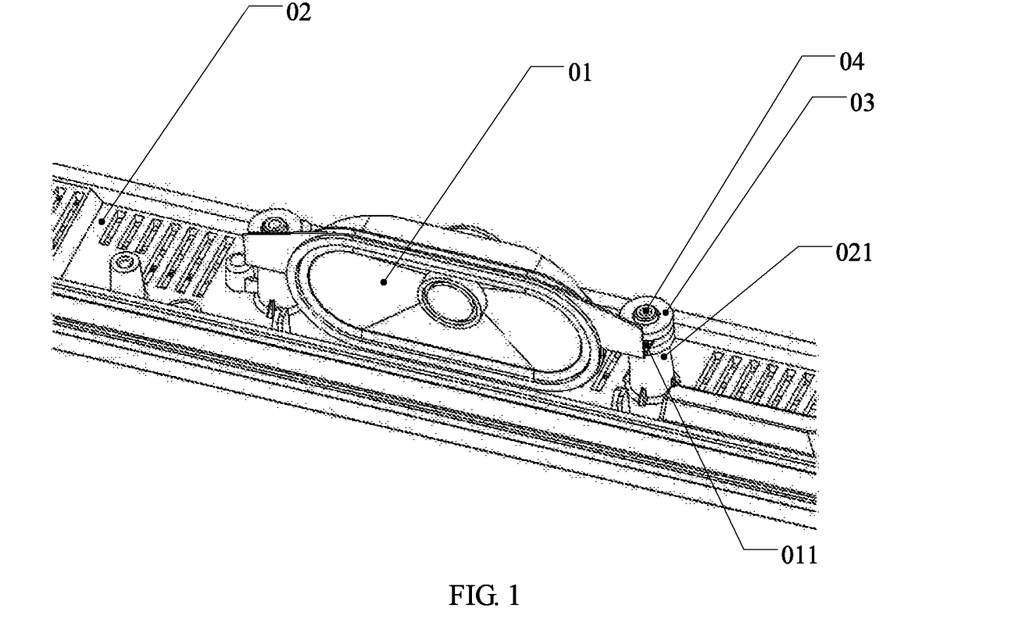
FIG. 1 is a schematic diagram illustrating a mounting means of a conventional loudspeaker and the complete machine.

As illustrated in FIG. 1, a loudspeaker 01 and a backplane 02 are usually fixed through the locking of screws 04; rubber rings 03 are disposed on mounting portions 021 of the backplane 02; the rubber ring 03 is fixed on the mounting portion 021 of the backplane 02 through the screw 04; and mounting portions 011 of the loudspeaker are mounted in the rubber rings 03, so as to achieve the assembly of the loudspeaker and the complete machine. When the loudspeaker produces sound, the loudspeaker with the connecting structure will drive the complete machine to vibrate and give out an undesired voice "zi . . . zi . . . ", and hence affect the overall sound effect of the loudspeaker. Moreover, the connecting structure must adopt screw locking, has complex processes and cumbersome operations, and is unfavorable for productivity optimization.

At least one embodiment of the present disclosure provides a sound-producing component, which comprises a sound-producing element, a backplane and at least one elastic element. The elastic element includes a first clamping portion and a second clamping portion; the sound-producing element includes a first mounting portion; the backplane includes a second mounting portion; the first mounting portion is clamped with one of the first clamping portion and the second clamping portion; and the second mounting portion is clamped with the other of the first clamping portion and the second clamping portion. Thus, the sound-producing element is fixed on the backplane.

The sound-producing component provided by at least one embodiment of the present disclosure can improve the sound effect, save the cost, and optimize the productivity.

Description will be given below with reference to several embodiments.

First Embodiment

Figure 2:
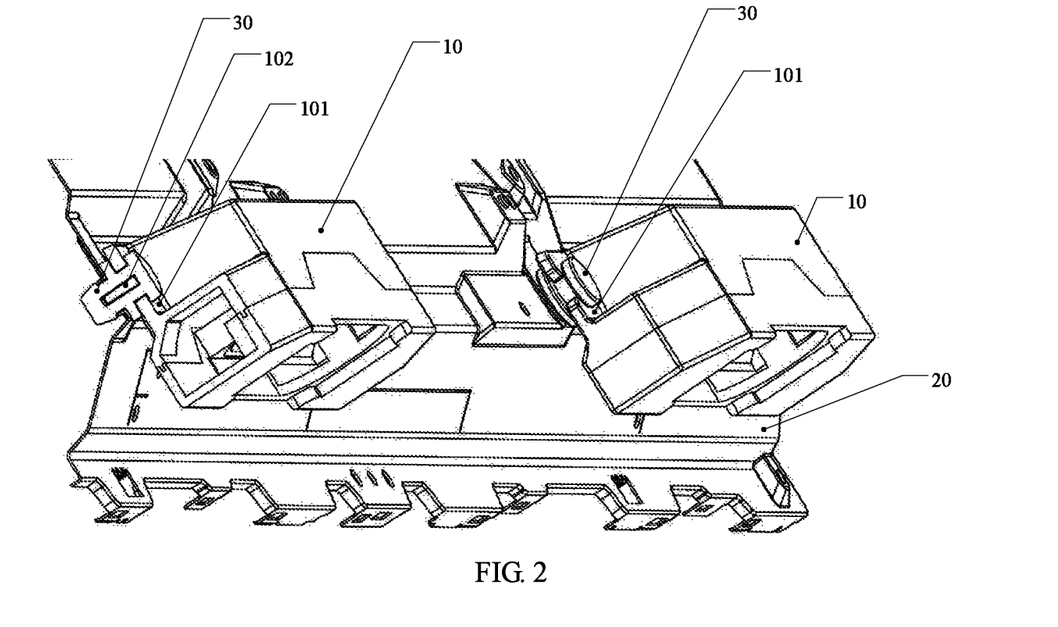
FIG. 2 is a schematic perspective view of a sound-producing component provided by one embodiment of the present disclosure.
Figure 5:
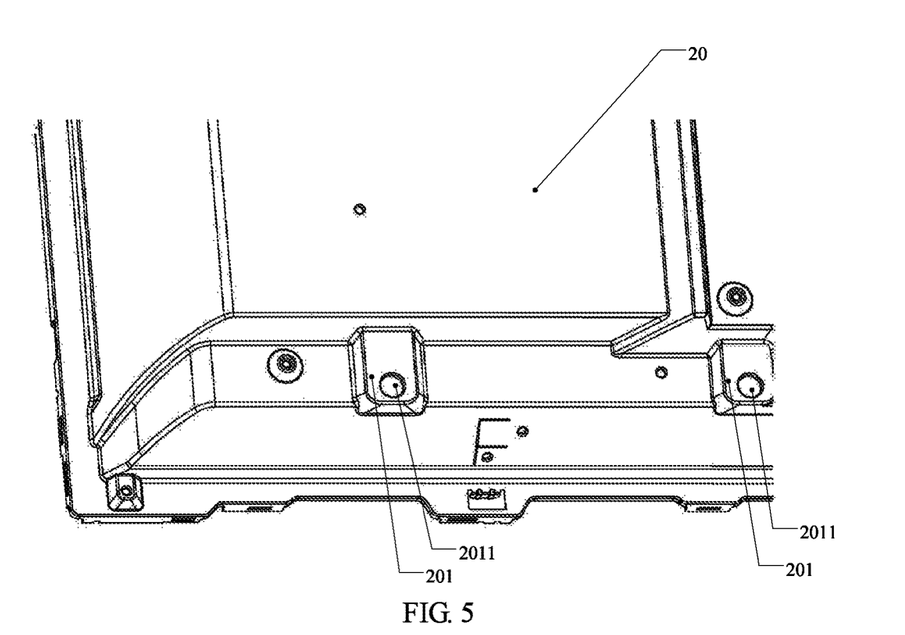
FIG. 5 is a schematic perspective view of a backplane in a sound-producing component provided by one embodiment of the present disclosure.

As illustrated in FIG. 2, the embodiment provides a sound-producing component, which includes a sound-producing element 10, a backplane 20 and at least one elastic element 30. The elastic element 30 includes a first clamping portion 301 and a second clamping portion 302; the sound-producing element 10 includes a first mounting portion 101; the backplane 20 includes a second mounting portion 201 (as illustrated in FIG. 5); the first mounting portion 101 is clamped with one of the first clamping portion 301 and the second clamping portion 302; and the second mounting portion 201 is clamped with the other of the first clamping portion 301 and the second clamping portion 302. Thus, the sound-producing element 10 is fixed on the backplane 20.

The sound-producing component provided by the embodiment changes the fixing mode between the conventional sound-producing element and the complete machine, adopts a clamped mounting structure of the sound-producing element, the elastic element and the backplane (complete machine), can reduce the vibration frequency of the sound-producing element and the complete machine when the sound-producing element produces sound, and improve the overall sound affect.

Compared with the usual mounting mode, the mounting mode of a part of the sound-producing element in contact with the complete machine is changed into fully elastic element clamped type, so as to reduce the vibration of the sound-producing element and the complete machine when the sound-producing element produces sound, and optimize the overall sound effect of the sound-producing element. Moreover, as viewed from the angle of production, the original several processes are reduced into one process. Thus, the manpower is reduced; the original locking screws are saved; the cost is reduced; and the productivity is optimized.

As illustrated in FIG. 2, in some examples, the sound-producing component includes two elastic elements 30. The two elastic elements 30 are respectively disposed on both sides of the sound-producing element 10. FIG. 2 illustrates two sound-producing elements 10. The elastic element 30 on the left in FIG. 2 is a sectional structure, so as to better illustrate a matching structure of the first mounting portion 101 of the sound-producing element 10 and the elastic element 30.

In the embodiment of the present disclosure, the sound-producing element 10 is, for instance, a loudspeaker. For instance, the elastic element 30 includes but not limited to a rubber element.

Figure 3A:
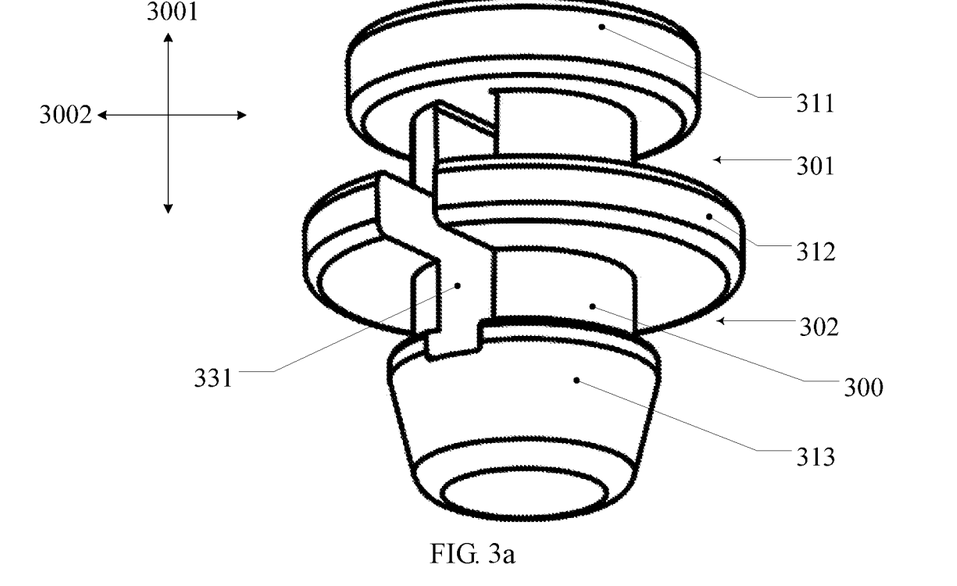
FIG. 3a is a schematic perspective view of an elastic element in a sound-producing component provided by one embodiment of the present disclosure.
Figure 3B:
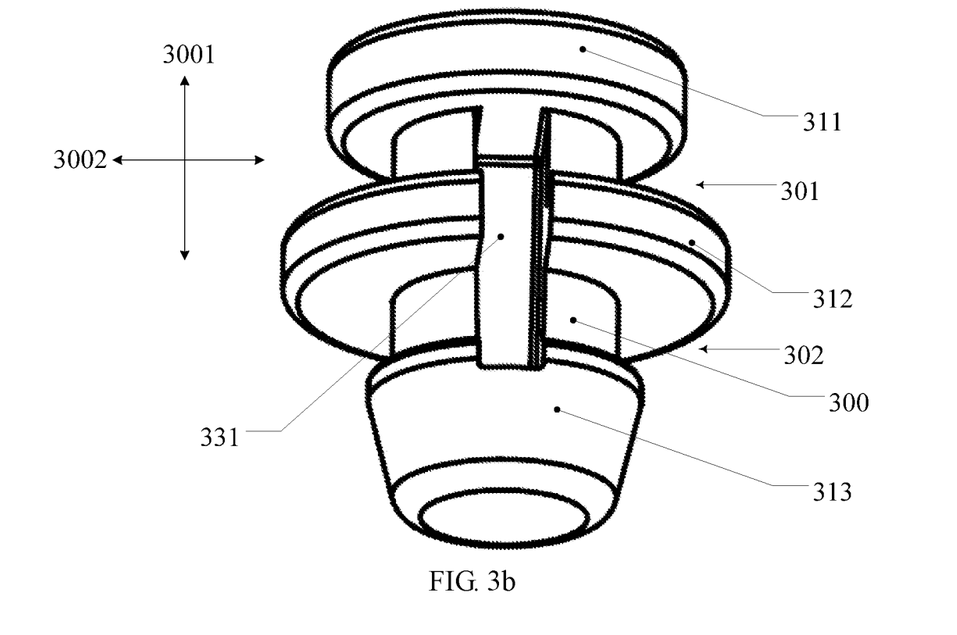
FIG. 3b is a schematic perspective view of the elastic element, viewed from another angle, in a sound-producing component provided by one embodiment of the present disclosure.

As illustrated in FIGS. 3a and 3b, in some examples, the elastic element 30 includes a main body 300 and a first protrusion 311, a second protrusion 312 and a third protrusion 313 which are protruded from the main body 300 and sequentially arranged on the main body 300; a first clamping portion 301 is formed among the first protrusion 311, the second protrusion 312 and the main body 300; and a second clamping portion 302 is formed among the second protrusion 312, the third protrusion 313 and the main body 300.

For instance, the first clamping portion 301 is formed among a lower surface of the first protrusion 311, an upper surface of the second protrusion 312, and the main body 300 disposed between the first protrusion 311 and the second protrusion 312; and the second clamping portion 302 is formed among a lower surface of the second protrusion 312, an upper surface of the third protrusion 313, and the main body 300 disposed between the second protrusion 312 and the third protrusion 313. In the elastic element 30 in the example, the formed first clamping portion 301 and the formed second clamping portion 302 can well accommodate the first mounting portion 101 of the sound-producing element 10 and the second mounting portion 201 of the backplane 20, and are favorable for the supporting of the sound-producing element 10. The elastic element 30 is employed to achieve the function of fixing the sound-producing element 10 and the backplane 20. Due to reduced contact area of the elastic element 30 and the complete machine and the flexibility of the elastic element 30, the vibration frequency of the sound-producing element 10 and the complete machine when the sound-producing element produces sound is reduced, and hence the overall sound effect is improved.

As illustrated in FIGS. 3a and 3b, in some examples, the main body 300 includes but not limited to a cylinder. For instance, the first protrusion 311, the second protrusion 312 and the third protrusion 313 are sequentially arranged on the main body 300 along a direction 3001 of a central axis of the main body. For instance, the first protrusion 311, the second protrusion 312 and the third protrusion 313 are respectively protruded from the main body 300 along a direction 3002 perpendicular to the central axis of the main body. For instance, the first protrusion 311, the second protrusion 312 and the third protrusion 313 are protruded from the main body 300 around the main body 300.

In some examples, the shape of the first mounting portion 101 is matched with the shape of the first clamping portion 301 or the second clamping portion 302 clamped with the first mounting portion; and the shape of the second mounting portion 201 is matched with the shape of the second clamping portion 302 or the first clamping portion 301 clamped with the second mounting portion. Thus, the clamped connection can be firmer.

Figure 4:
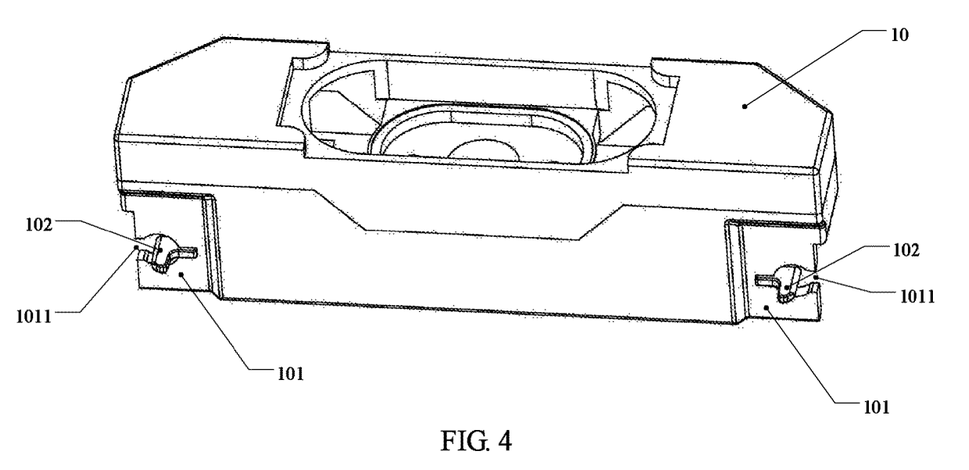
FIG. 4 is a schematic perspective view of a sound-producing element in a sound-producing component provided by one embodiment of the present disclosure.

As illustrated in FIGS. 3a, 3b and 4, in some examples, the elastic element 30 is provided with a first recess 331; and the first mounting portion 101 is provided with a first projection 102 matched with the first recess 331. As the sound-producing element 10 has certain weight, the arrangement of the first recess 331 and the first projection 102 can obtain firmer clamped connection between the sound-producing element 10 and the elastic element 30 and then well support the sound-producing element 10. It should be noted that the first recess 331 and the first projection 102 can also be not provided. No limitation will be given here in the embodiment of the present disclosure.

For instance, as illustrated in FIG. 4, the first mounting portion 101 includes but not limited to an opening 1011. For instance, the first mounting portion 101 can include a through hole. The opening or the through hole is configured to be clamped with the first clamping portion 301 or the second clamping portion 302. The first projection 102 is disposed in the opening or the through hole of the first mounting portion 101, and projected from the first mounting portion 101 in a direction perpendicular to the first mounting portion 101. The case can also refer to FIG. 2. In FIG. 2, the first projection 102 runs through the opening 101. Of course, the first projection 102 can also be disposed on one side of the opening or the through hole of the first mounting portion 101. No limitation will be given here in the embodiment. It should be noted that the shape of the first mounting portion 101 and the first projection 102 is not limited in the embodiment.

As illustrated in FIGS. 3a, 3b, 4 and 5, in some examples, a clamping length of the first mounting portion 101 and one of the first clamping portion 301 and the second clamping portion 302 is greater than half of a circumference of the main body 300; and a clamping length of the second mounting portion 201 and the other one of the first clamping portion 301 and the second clamping portion 302 is equal to the circumference of the main body 300. Thus, the clamped connection can be firmer. As illustrated in FIG. 5, the second mounting portion 201 includes a through hole 2011. FIG. 6b is a schematic diagram illustrating the clamped connection between the through hole 2011 and the backplane 10.

Figure 6A:
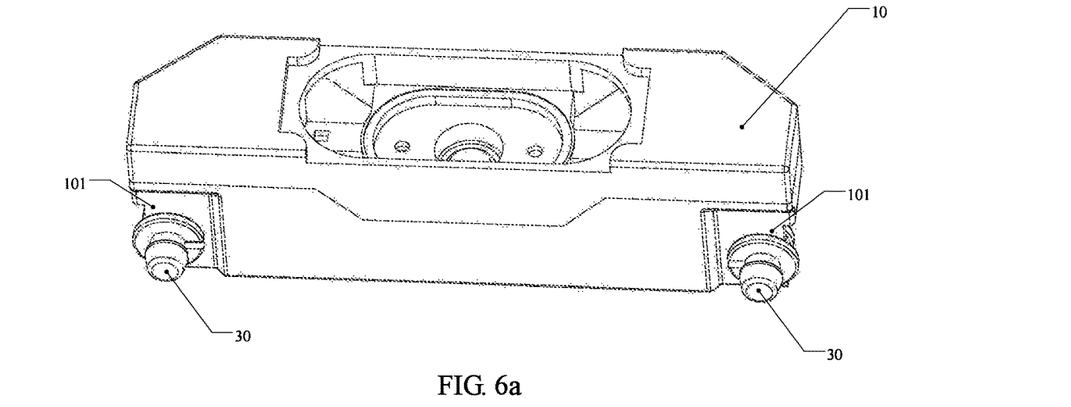
FIG. 6a is a perspective assembly diagram of a sound-producing element and an elastic element in a sound-producing component provided by one embodiment of the present disclosure.
Figure 6B:
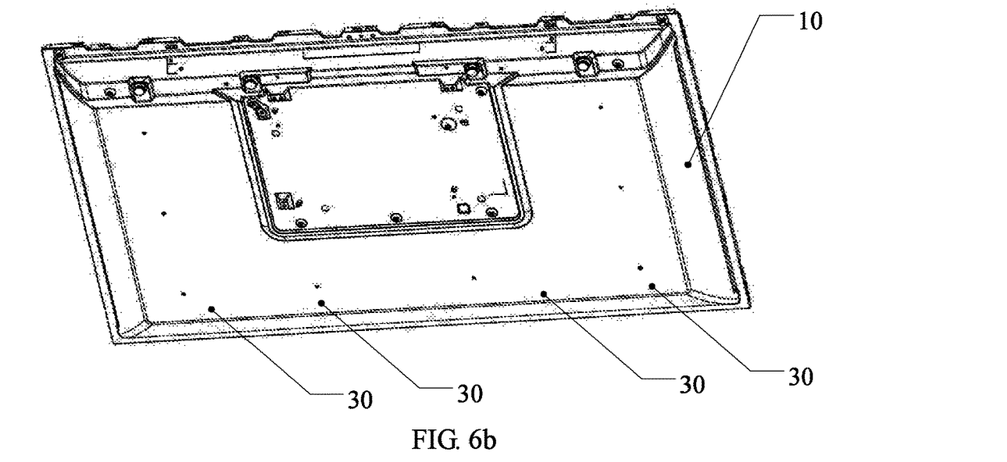
FIG. 6b is an assembly diagram of a backplane and an elastic element in a sound-producing component provided by one embodiment of the present disclosure.

FIG. 6a is a mounting diagram of a sound-producing element 10 and an elastic element 30. FIG. 6b is a mounting diagram of a backplane 20 and an elastic element 30. For instance, in the mounting process, the first mounting portion 101 of the sound-producing element 10 can be clamped with the first clamping portion 301 of the elastic element 30. For instance, the opening or the through hole of the first mounting portion 101 is in contact with the main body 300 disposed between the first protrusion 311 and the second protrusion 312. When the first recess 331 and the first projection 102 are arranged and the elastic element 30 and the sound-producing element 10 are clamped, the first recess 331 and the first projection 102 are also matched with each other. Subsequently, the second clamping portion 302 of the elastic element 30 is clamped with the backplane 20. For instance, the third protrusion 313 runs through the through hole 2011 of the second mounting portion 201 of the backplane 20, and the main body 300 between the second protrusion 312 and the third protrusion 313 is placed into the through hole 2011. Of course, the elastic element 30 and the backplane 20 can also be mounted at first, and then the elastic element 30 and the sound-producing element 10 are mounted. No limitation will be given here in the embodiment. For instance, as illustrated in FIG. 6a, the first mounting portion 101 of the sound-producing element 10 is in close contact with the elastic element 30. For instance, an upper surface of the first mounting portion 101 is in close contact with a lower surface of the first protrusion 311; a lower surface of the first mounting portion 101 is in close contact with an upper surface of the second protrusion 312; and an edge of the opening or the through hole of the first mounting portion 101 is in close contact with the main body 300 disposed between the first protrusion 311 and the second protrusion 312. For instance, as illustrated in FIG. 6b, the second mounting portion 201 of the backplane 20 is also in close contact with the elastic element 30. For instance, an upper surface of the second mounting portion 201 is in close contact with a lower surface of the second protrusion 312; a lower surface of the second mounting portion 201 is in close contact with an upper surface of the third protrusion 313; and an edge of, for instance, the through hole of the first mounting portion 201 is in close contact with the main body 300 disposed between the second protrusion 312 and the third protrusion 313. The elastic element 30 in the embodiment can obtain stronger and more convenient mounting operability of the sound-producing element 10 and the backplane 20, can improve the efficiency of the production line, save the manpower and the cost, also save the screws required to be used in the fixed connection between the conventional sound-producing element and the backplane, and hence reduce the material cost, and is in line with the needs of the current market.

Second Embodiment

Figure 7:
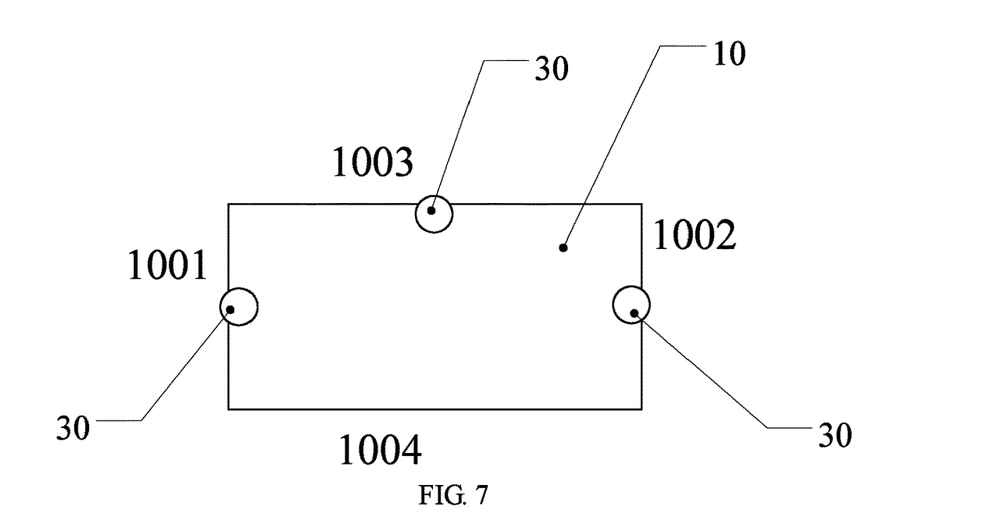
FIG. 7 is a schematic diagram of a sound-producing component provided by another embodiment of the present disclosure.

As illustrated in FIG. 7, the differences between the embodiment and the first embodiment are that: the sound-producing component includes three elastic elements 30; two elastic elements 30 are respectively disposed on both sides (a first side 1001 and a second side 1002) of the sound-producing element 10; and the third elastic element 30 is disposed on a third side 1003 of the sound-producing element 10. For instance, the sound-producing component can also include four elastic elements 30, and a fourth elastic element can be disposed on a fourth side 1004 opposite to the third side.

It should be noted that: in the embodiment of the present disclosure, the number of the elastic elements 30, arranged for the mounting of each sound-producing element 10, is not limited.

The remaining can refer to the description in the first embodiment. No further description will be given here.

Third Embodiment

The embodiment provides a display device, which includes any sound-producing component provided by the embodiment of the present disclosure.

In some examples, the display device includes a TV, but not limited thereto.

The following statements should to be noted.

(1) The same reference numerals denote the same elements/components unless otherwise defined.

(2) The accompanying drawings involve only the structure(s) in connection with the embodiment(s) of the present disclosure, and other structure(s) can be referred to common design(s).

(3) In order to clearly illustrate, an element/component or a thickness of an area may be amplified in the drawings of the embodiments of the present disclosure.

(4) In case of no conflict, features in one embodiment or in different embodiments can be combined.

What have been described above are only specific implementations of the present disclosure, the protection scope of the present disclosure is not limited thereto. Any changes or substitutions easily occur to those skilled in the art within the technical scope of the present disclosure should be covered in the protection scope of the present disclosure. Therefore, the protection scope of the present disclosure should be based on the protection scope of the claims.

This application claims the benefit of priority from Chinese patent application No. 201620497930.7, filed on May 26, 2016, the disclosure of which is incorporated herein in its entirety by reference as a part of the present application.

What is claimed is:

1. A sound-producing component, comprising a sound-producing element, a backplane and at least one elastic element, wherein the elastic element comprises a first clamping portion and a second clamping portion; the sound-producing element comprises a first mounting portion; the backplane comprises a second mounting portion; the first mounting portion is clamped with the first clamping portion; and the second mounting portion is clamped with the second clamping portion;

wherein the elastic element comprises a main body, a first protrusion, a second protrusion and a third protrusion; the first protrusion, the second protrusion, and the third protrusion are protruded from the main body and sequentially arranged on the main body; the first clamping portion is formed among the protrusion, the second protrusion and the main body; and the second clamping portion is formed among the second protrusion, the third protrusion and the main body;

wherein the elastic element is provided with a first recess, and the first mounting portion is provided with a first projection matched with the first recess; and wherein the first recess is recessed in the main body, the second protrusion and a part of the third protrusion close to the second protrusion.

2. The sound-producing component according to claim 1, the at least one elastic element comprising two elastic elements, wherein the two elastic elements are respectively disposed on both sides of the sound-producing element.

3. The sound-producing component according to claim 1, the at least one elastic element comprising three elastic elements, wherein two elastic elements are respectively disposed on both sides of the sound-producing element; and a third elastic element is disposed on a third side of the sound-producing element.

4. The sound-producing component according to claim 1, wherein a shape of the first mounting portion is matched with a shape of the first clamping portion; and a shape of the second mounting portion is matched with a shape of the second clamping portion.

5. The sound-producing component according to claim 4, wherein the main body comprises a cylinder.

6. The sound-producing component according to claim 5, wherein the first protrusion, the second protrusion and the third protrusion are sequentially arranged on the main body along a direction of a central axis of the main body.

7. The sound-producing component according to claim 6, wherein the first protrusion, the second protrusion and the third protrusion are respectively protruded from the main body along a direction perpendicular to the central axis of the main body.

8. The sound-producing component according to claim 7, wherein the first protrusion, the second protrusion and the third protrusion are protruded from the main body around the main body.

9. The sound-producing component according to claim 7, wherein a clamping length of the first mounting portion and the first clamping portion is greater than half of a circumference of the main body; and a clamping length of the second mounting portion and the second clamping portion is equal to the circumference of the main body.

10. A sound-producing component, comprising a sound-producing element, a backplane and at least one elastic element, wherein the elastic element comprises a first clamping portion and a second clamping portion; the sound-producing element comprises a first mounting portion; the backplane comprises a second mounting portion; the first mounting portion is clamped with the first clamping portion; and the second mounting portion is clamped with the second clamping portion;

wherein the elastic element comprises a main body, a first protrusion, a second protrusion and a third protrusion; the first protrusion, the second protrusion and the third protrusion are protruded from the main body and sequentially arranged on the main body; the first clamping portion is formed among the first protrusion, the second protrusion and the main body; and the second clamping portion is formed among the second protrusion, the third protrusion and the main body;

wherein the elastic element is provided with a first recess, and the first mounting portion is provided with a first projection matched with the first recess;

wherein the first mounting portion comprises an opening or a through hole; and the first projection passes through the opening or the through hole of the first mounting portion, or is disposed on a side of the opening or the through hole of the first mounting portion and projected from the first mounting portion in a direction perpendicular to the first mounting portion.

11. The sound-producing component according to claim 1, wherein the second mounting portion comprises a through hole.

12. The sound-producing component according to claim 1, wherein a material of the elastic element comprises rubber.

13. A display device, comprising the sound-producing component according to claim 1.

14. The sound-producing component according to claim 1, wherein the first mounting portion is in contact with a lower surface of the first protrusion, an upper surface of the second protrusion and a part of the main body between the first protrusion and the second protrusion.

15. The sound-producing component according to claim 1, wherein the second mounting portion is in contact with a lower surface of the second protrusion, an upper surface of the third protrusion and a part of the main body between the second protrusion and the third protrusion.

16. The sound-producing component according to claim 1, wherein the first protrusion, the second protrusion and the third protrusion are overlapped in a direction along a central axis of the main body.

17. The sound-producing component according to claim 1, wherein in a direction perpendicular to a central axis of the main body, a length of the second protrusion is greater than that of the first protrusion or the third protrusion.

18. The sound-producing component according to claim 1, wherein a size of the first recess in a direction parallel with a central axis of the main body is less than a size of the main body in the direction of the central axis of the main body.

19. A sound-producing component, comprising a sound-producing element, a backplane and at least one elastic element, wherein the elastic element comprises a first clamping portion and a second clamping portion; the sound-producing element comprises a first mounting portion; the backplane comprises a second mounting portion; the first mounting portion is clamped with the first clamping portion; and the second mounting portion is clamped with the second clamping portion;

wherein the elastic element comprises a main body, a first protrusion, a second protrusion, and a third protrusion; the first protrusion, the second protrusion and the third protrusion are protruded from the main body and sequentially arranged on the main body; the first clamping portion is formed among the first protrusion, the second protrusion, and the main body; and the second clamping portion is formed among the second protrusion, the third protrusion, and the main body;

wherein the elastic element is provided with a first recess, and the first mounting portion is provided with a first projection matched with the first recess;

wherein the first mounting portion comprises an opening or a through hole; and the first projection passes through the opening or the through hole of the first mounting portion, or is disposed on a side of the opening or the through hole of the first mounting portion and projected from the first mounting portion in a direction perpendicular to the first mounting portion; and wherein the first projection goes beyond a central line of the opening or the through hole of the first mounting portion.

\* \* \* \* \*